Nov. 18, 1969   A. W. PATZLAFF   3,478,501
BERRY HARVESTING MACHINE
Filed March 2, 1967   2 Sheets-Sheet 1

INVENTOR.
ALBERT W. PATZLAFF
BY
ATTORNEYS

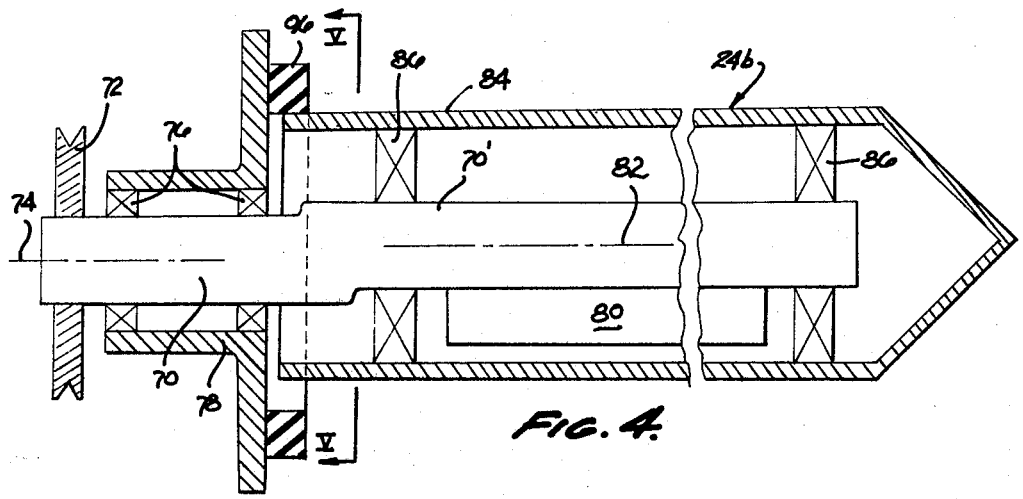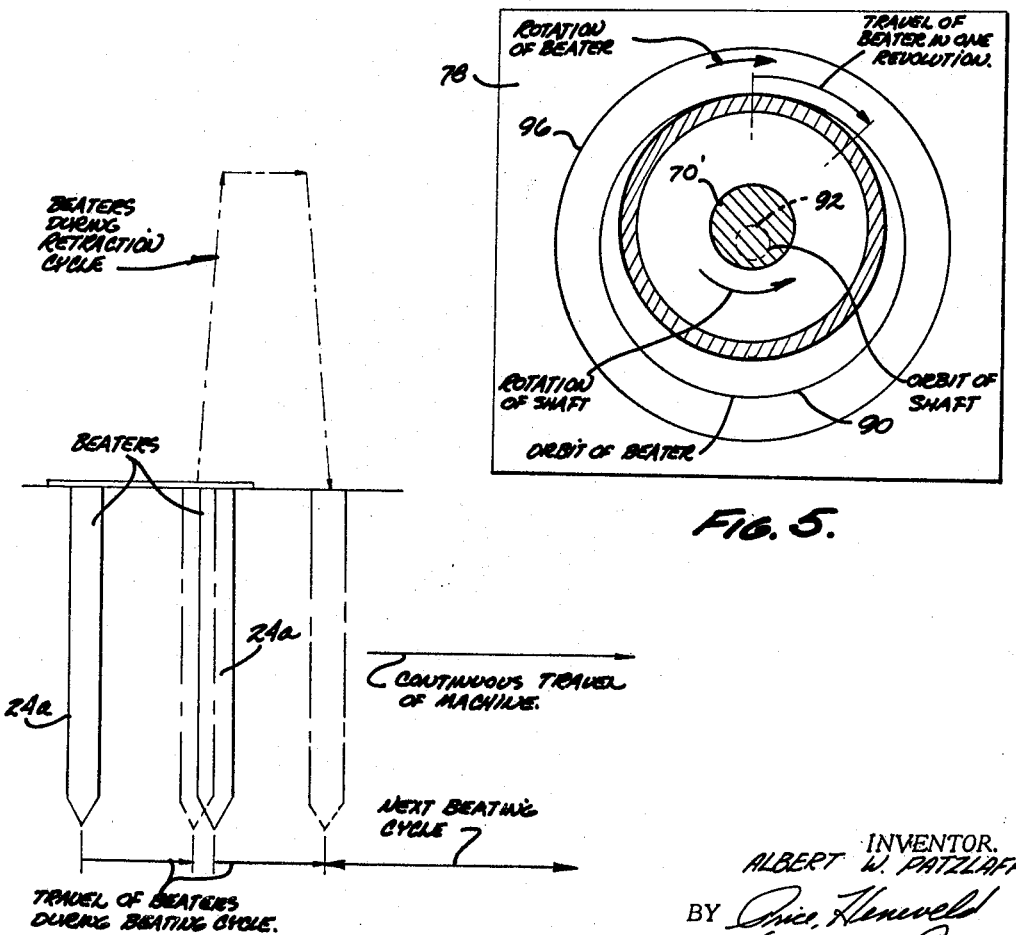

though each beater is not hand manipulated. The special
United States Patent Office

3,478,501
Patented Nov. 18, 1969

3,478,501
BERRY HARVESTING MACHINE
Albert W. Patzlaff, 15551 Quincy St.,
Holland, Mich. 49423
Filed Mar. 2, 1967, Ser. No. 620,101
Int. Cl. A01g *19/00*
U.S. Cl. 56—330             15 Claims

ABSTRACT OF THE DISCLOSURE

A harvester unit for vibrationally removing crop items such as fruits, vegetables, nuts, and the like, particularly berries such as blueberries, from branches particularly of bushes, with minimum scuffing of the branches, such unit having eccentrically driven, rotational beaters, the branch-engaging periphery of which is free from inner rotating shaft means, and preferably rotates opposite the arcuate advancing direction of the unit, by the use of a freely rotatable sleeve eccentrically driven by the inner rotational eccentric shaft but reversely rotated by peripherally engaging a surrounding friction element.

Also, a vehicular harvesting machine shiftably mounting a series of such beater units, when specifically oriented, in a special fashion for shifting them into and out of bush engagement while continuously operated and advanced.

BACKGROUND

This invention relates to a harvester unit and a harvesting machine, and more particularly relates to harvesting apparatus that vibrationally removes fruit from the branches with minimum scuffing of the branches.

The description of the prior art and of this invention will largely be made with respect to the harvesting of blueberries for which it was initially and primarily developed. However, the invention can conceivably be employed for other crops that grow on branches, as of bushes or small trees. Further, for convenience, the items removed from the branches will be described as "fruit," but this is intended to encompass crops that might normally be categorized as vegetables, grains or nuts, and the like, if such crops are subject to being harvested by being vibrated from their supporting branches.

Basically, conventional vibrational type harvesters generally employ either a branch or bush grasping and shaking mechanism that is customarily mounted on a vehicle, or an eccentric apparatus that is hand held and manipulated into the branches to thrash them with a beating action, or a battery of vehicle mounted beaters that sweep across the branches and are mounted on an elliptical endless carrier.

The inventor herein has determined that the beating type action is often more effective than the shaking type equipment. Further, the beater type can more readily be adapted to hand held units.

However, known beater type units do have the very undesirable characteristic of seriously scuffing substantial amounts of bark off the branches as the unit moves in its eccentric path but does not rotate, even when it is carefully manipulated into the branches. This frequently substantially impairs the future producing capacity of the bush. This is particularly true of blueberry bushes. If these conventional beater units were to be mounted as a group to a vehicle, moreover, rather than carefully operated individually by hand, even the slight control now maintained would be lost, so that harvested bushes would be even further damaged.

Further, the sweep type units leave areas of the bush unaffected because it is necessary to arrest the advancement of the sweep unit in the bush or the branches will be uncontrollably broken. The fruit is thus partially lost by remaining on the bushes, and moreover, becomes overripe to cause sorting problems with the next picking. Even then, many branches are regularly broken off the bushes as the arcuately sweeping beaters enter and leave the bushes.

SUMMARY OF THE INVENTION

It is an object of this invention to provide a harvester unit capable of vibrationally removing fruit from the branches by beating the branches, but with little or no scuffing of bark from the branches, by the use of a special eccentric assembly that does not have a fixed, non-rotational characteristic on the outer periphery, but rather has a special type of rotational action with respect to the branches. The bush contacting surface of the unit is free to rotate independent of the rotating driving eccentric shaft inside it, to avoid scuffing off of bark. In fact, the branch-contacting surface is purposely caused to rotate slowly in a direction reverse of the direction of the arcuate eccentric advancement of the unit, to cause it to roll along the contacted branches in optimum engagement therewith.

Another object of this invention is to provide a harvesting machine in vehicular form, employing a plurality of special beater units capable of accommodating entire bushes as the machine advances, without serious scuffing of the branches by any of the controlled beater units, even beaters are oriented perpendicular with respect to the direction of vehicle travel, and are specially controlled so that, as the vehicle continuously progresses down a row, with the beaters being controllably inserted and retracted at short intervals, thorough harvesting is achieved, yet without branch damage.

These and other related objects will become apparent upon studying this disclosure.

The novel beater unit employs a powered rotational shaft having offset crank portions to obtain the eccentric operation, and a surrounding beater member, preferably a sleeve, mounted to be eccentrically driven by the shaft, but freely rotatable with respect to the shaft so as not to rotate therewith, having a bush contacting periphery with an orbit substantially greater than the shaft crank orbit and engaged progressively by special friction contacting means that causes it to rotate in a direction opposite to its orbital advance direction.

The novel harvester machine is a powered vehicle that preferably straddles bushes and has a plurality of the novel beater units that are continuously eccentrically operated, are oriented laterally into the bushes perpendicular to the line of vehicle travel, and are shiftable from a retracted condition out of the branches to an inserted condition in the branches, for repeated shifting between said conditions as the vehicle continuously advances.

BRIEF DESCRIPTION OF THE DRAWINGS

FIG. 4 is an enlarged sectional view of one of the beater units in the machine in FIGS. 1 through 3;

FIG. 5 is a sectional enlarged view of the beater unit in FIG. 4, taken on plane V—V of FIG. 4; and FIG. 6 is a fragmentary plan view of one set of beater units on one side of the machine, also illustrating in phantom the progressive position of the beater units with progression of the vehicle.

DESCRIPTION OF THE PREFERRED EMBODIMENTS

Figure 2:
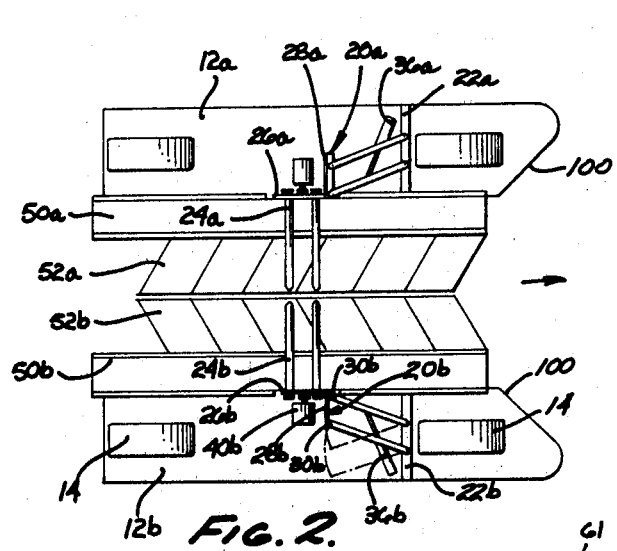
FIG. 2 is a plan view of the machine in FIG. 1, taken generally on plane II—II of FIG. 1.
Figure 1:
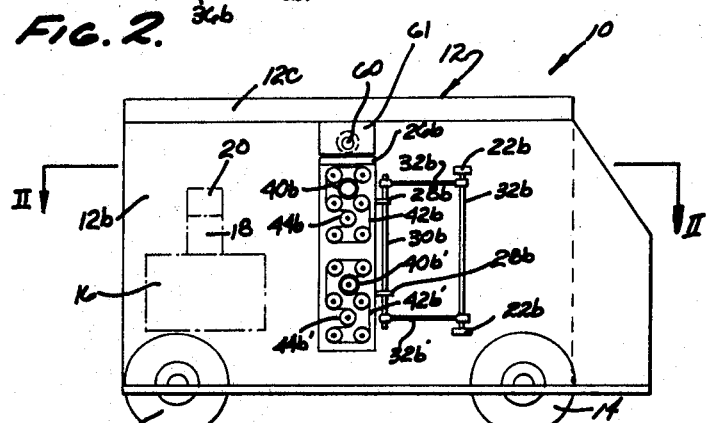
FIG. 1 is a side elevational view of the novel harvesting machine.
Figure 3:
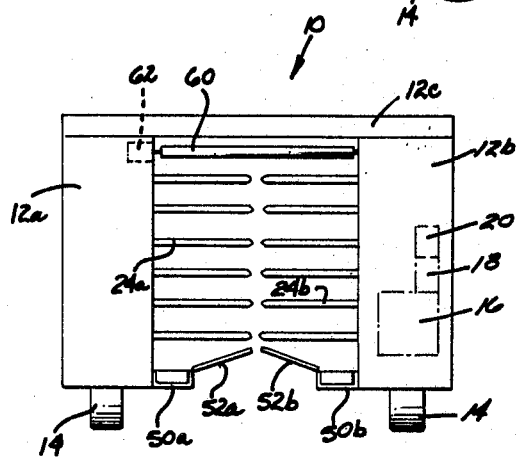
FIG. 3 is a rear elevational view of the machine in FIGS. 1 and 2.

Referring now specifically to the drawings, the harvesting machine 10 is there illustrated in FIGS. 1 through 3 as a vehicular unit composed of a suitable framework 12 shown partially schematically, mounted on a plurality of wheels 14, here shown to be four in number, two on each side of the vehicle. The vehicle basically has an inverted U-shaped configuration, with an overhead cross beam 12c interconnecting with a pair of spaced, depending side leg portions 12a and 12b. Mounted to the vehicle is a suitable power source such as a conventional internal combustion engine 16 which is illustrated schematically and which is operably connected by conventional means (not shown) to drive the wheels. The engine is drivingly connecting to an electrical power generator 18 and an hydraulic pumping means 20. All three of these conventional units 16, 18 and 20 are only shown schematically since detailed description thereof would only unduly lengthen this description of the invention. Actually, the drive connection from the engine to the wheels may be mechanical, electrical, or hydraulic as desired. The inverted U-shaped vehicle structure effectively straddles a row of bushes such as blueberry bushes so that, as the vehicle is slowly driven along the row, the crop may be harvested. The front wheels of the vehicle may be turned by conventional steering mechanism (not shown) to enable the vehicle to be maneuvered into position and to be maneuvered from one row to the next.

Mounted on the opposite sides of the vehicle is a pair of beater subassemblies 20a and 20b. These subassemblies are alike, except being positioned in mirror image fashion as illustrated in FIG. 2. Subassembly 20a is physically mounted to the vehicle by being attached to a pair of vertically spaced, outwardly laterally extending rigid support beams 22a, while subassembly 20b is likewise mounted to support beams 22b. The beater units themselves, specifically, beater units 24a and 24b are mounted respectively to a pair of vertically oriented support plates 26a and 26b. Projecting laterally outwardly from these members 26a and 26b is a pair of fixed bars 28a and 28b which are preferably attached to a pair of vertical pivot rods, e.g. 30b for subssembly 20b. Also attached to these rods on each unit is a pair of parallel upper arms and a pair of parallel lower arms designated 32b and 32b' for subssembly 20b (FIG. 1). On the opposite ends of these links or arms is a pivotal connection to a pair of vertical rods 32b which in turn are mounted vertically between the beams 22b for subassembly 20b. It will be understood that the mechanism for subassembly 20a is of this same type, and therefore a side elevation of the opposite side of the machine is not here given. In effect, a parallelogram linkage is formed between the fixed supports 22b, the links from these fixed supports, and the movable mounting plate for the beater units, so that the beater units can be shifted from an inward bush engaging position illustrated in FIGS. 2 and 3, to a retracted position generally out of engagement with the bushes as partially illustrated in phantom lines in FIG. 2. This shifting action can be achieved by suitable power means such as hydraulic cylinders 36a and 36b on opposite sides of the machine. Hydraulic cylinders 36a and 36b are powered from the pump 20 operably driven by engine 16. Suitable hose connections are made from the pump to the cylinders, with a detailed showing thereof not being made as this technology is well-known, and would only unduly complicate any description given. In moving between these alternate conditions, the beater members move either away from the opposite leg of the vehicle or toward the opposite leg of the vehicle, from a first position spaced substantially away from each other to a second position with the inner ends of the beater members 24a and 24b closely adjacent to but slightly spaced from each other.

In the illustrated form of the invention, these beater members in each subassembly are shown to be in two series, one spaced behind the other, so that each subassembly includes a plurality of vertically spaced members in two vertical rows.

The beater members are power driven, preferably by two electrical motors for each subassembly, e.g. electrical motors 40b and 40b' for subassembly 20b (FIG. 1). Each of the beater units is rotationally mounted on its support plate, e.g. beater unit 24b on plate 26b, with the drive connection from the motors to these units being by a suitable belt and pulley assembly or chain and sprocket assembly like those illustrated in FIG. 1. In this particular form of the invention, belts 42b and 42b' each power six of the beater units, with an adjustable idler pulley, 44b and 44b' being employed to control the tautness thereof. Obviously, this particular drive arrangement may vary greatly without departing from the concept herein. In fact, these electrical motors may actually be hydraulic motors, pneumatic motors, or mechanical drive arrangements of equivalent type. The electrical motor arrangement does provide a certain desirable flexibility for the apparatus.

Above these beater subassemblies 24a and 24b is at least one additional non-retracting beater unit 60 that extends clear across the space between the opposite legs of the frame assembly, is rotationally mounted between a pair of fixed depending support plates 61 above plates 26a and 26b, and is driven by a suitable electrical motor 62, for accommodating the top branches of the bushes in a manner to be described hereinafter.

Beneath these beater units is collecting means which may include, for example, a pair of elongated collector troughs 50a and 50b which receive berries from a plurality of flexible bush underlying apron members 52a and 52b that project downwardly and outwardly toward these troughs from an inner position extending substantially across the space between the legs of the vehicle. These aprons underlie the bushes being harvested, and thereby receive the fruit from the bushes for transfer into the troughs and subsequent transfer into suitable collecting means (not shown).

The electrical motors for these beater units are driven by power from generator 18, with suitable electrical connections being made therebetween.

Each of the beater units has a special construction as illustrated in FIGS. 4 and 5. Illustrating one of the beaters 24b for example, it includes a rotationally driven shaft which has a main rotational shaft portion 70 fixedly connected to drive pulley 72 that is power driven by belt 42b, for example. This main shaft portion 70 spins on its axis 74 and is rotationally mounted in a plurality of bearings 76 within a bearing housing 78 that is affixed to plate 26b. A second portion 70' protrudes from the main shaft portion, and is radially offset to form crank portions for achieving the eccentric motion desired. Counter-balancing this offset is a suitable counterweight 80.

Rotationally journaled about the axial center 82 of crank portions 70' of the shaft is a special elongated hollow sleeve 84 mounted on these crank portions of the shaft by a plurality of bearings 86. These bearings allow free rotation of the bush contacting sleeve member 84 independent of the high speed rotation of the shaft. Yet, the eccentric movement of the shaft is transmitted to this outer member to cause its outer periphery to follow the beater orbit 90 (FIG. 5). This beater orbit is substantially larger, and preferably several times larger, than the small eccentric shaft orbit 92 (FIG. 5).

A serious defect of prior beater type units was the detrimental bark scuffing action of the non-rotating outer periphery of the eccentric beater units, to thereby scuff the bark during the beater orbital movement. Even with smooth outer peripheral surfaces on this prior type equipment, the bar was constantly seriously scuffed even when carefully manually manipulated into the bush. Since the novel unit has the outer bush contacting member freely rotatable with respect to the high speed rotational eccentric shaft, it does not have the scuffing tendencies of the prior unit.

Scuffing is even further minimized by the employment of a special peripheral contacting means such as a rubber or other frictional engaging element preferably shaped like a ring 96, and secured to the radially extending flange of bearing housing 78 as by adhesive. It is positioned concentric with spin axis 74 of the main shaft portion 70. The radial spacing of the inner periphery of this ring from spin axis 74 is equal to the maximum orbital radius of the outer periphery of the bush contacting beater element 84 from this spin axis. Hence, as the shaft rotates and oscillates the outer beater member, successive portions of the outer periphery of the beater member will contact progressive circumferential inner peripheral portions of this ring, causing the beater member to actually rotate in a reverse direction of the rotation of the shaft and therefore in a reverse direction of the orbital advancement of member 84 during operation, and to rotate at a fraction of the forward rotational rate of the shaft. Thus, as the beater member moves along the surface of a branch during its orbital advance, its periphery will actually rotate rearwardly, to counteract any tendency of the advancing beater to scuff the bark off the branch by rolling over the branch at about the speed of advancement of the beater along the branch. By controlling the orbit differentials between the shaft and the beater, moreover, the amount of circumferential reverse movement of the beater can be made a controlled fraction of the rotational advance of the shaft, so that the relative surface movement between the outer beater periphery and the branch contacted is made negligible. In the illustrated structure in FIG. 5 for example, by making the orbital radius of the beater several times that of the shaft, the outer periphery of the beater will move in a reverse direction of about ⅛ of the forward movement of the shaft, so that the periphery of the beater appears to stand still with respect to the surface of the branch over which it is moving. It will be obvious that this particular mathematical relationship can be varied to obtain the best results on the particular type of crop harvested and the size of the beater units themselves. Moreover, since the contact of each beater 84 with peripheral ring 96 is frictional, a substantial frictional stress of the beater with a branch clump will allow slippage between these elements to the benefit of the branch so that no scuffing will be caused by the rearward beater rotation.

As a result, the novel type of beater units can be inserted into the bushes without fear of scuffing the branches any significant amount. Hence, no careful manual manipulation of the beaters into the bush need be employed. However, the individual beaters, or a small plurality of the beaters can be employed on a hand held type unit since this is frequently desirable, especially for smaller size bushes. Alternatively, it is now practical to mount a large number of the beaters on the vehicular type construction illustrated in FIGS. 1 through 3, for completely automatic harvesting of the crop. Beater unit 60 has the same type of shaft with crank portions mounting the surrounding sleeve on bearings, so that a cross section thereof appears like that in FIG. 5. It is longer, however, and may have both shaft ends rotationally mounted.

In operation, if the individual beaters are employed on a hand unit, the unit is rotationally driven so that the shaft and its crank portion are revolved at high speeds such as around 2,000 revolutions per minute. The outer periphery of the beater element will then revolve in the reverse direction at about 250 revolutions per minute or so. The unit is then manually projected into the bush so that the vibratory motion on the bush caused by the eccentric driving action will vibrationally beat the berries from the bush, while not scuffing the bark from the bush as the beater is advanced laterally of the branches.

Alternatively, the beaters can be specially mounted on a vehicle in the fashion illustrated in FIGS. 1 through 3. As the vehicle is advanced in the direction indicated generally by the arrow in FIG. 2, i.e. transverse to the branches, the bushes will be guided into the central portion of the vehicle by the slanted front guide surfaces 100, so that the basic stem of the bushes passes between apron members 52a and 52b. It is important that the reciprocable beaters be inserted axially into the bush, with their orientation being substantially normal to the direction of vehicle advance. These laterally oriented beaters cause a minimum of bush disturbance with their axial insertion and removal. As the vehicle slowly advances, the beater subassemblies are inserted for a short interval of time of about one second or so, and then quickly retracted and reinserted at a short distance ahead. The timing of this may be controlled by suitable timing mechanism or manually, causing all of the bush to be harvested. The spacing of the two series of beaters in each subassembly is preset so that upon retraction and reinsertion thereof, the rearward series can slightly overlap the space where the forward series was at the instant of retraction. The beaters should not be left continually in the bushes as the vehicle advances, assuming that the vehicle is going to be continuously advanced as is desirable, since the beaters would bend the branches excessively in a damaging manner. This practice should be followed with blueberry bushes, but may vary somewhat depending upon the type of crop being harvested. Assuming that blueberries are being harvested, the beaters are inserted as shown in solid lines in FIG. 6 for example, while the vehicle is being advanced an amount indicated by the arrows designated "travel of beaters during beating cycle." They are then completely retracted out of the bush momentarily as the vehicle continues to advance, and reinserted as illustrated by the phantom lines in FIG. 6, so that the rearward most beater series overlaps slightly with the previous position of the forward most series so as to cover the entire bush as the machine progresses. When the beaters are quickly withdrawn along their axis, the agitated branches are freed to return to their original position as the machine moves to the next cycle. The method of introducing and withdrawing the elongated beaters, the special eccentric and rotational action thereof and the controlled timing of duration within the bush assures complete harvesting without concomitant bush damage. The novel beater assembly vehicle also enables the operator to retract the beaters in order to by pass obstacles such as upstanding sprinkler pipes or the like, or to bypass a bush that should not be harvested for some reason. The machine has substantial flexibility of operation.

It is entirely conceivable that those having ordinary skill in the art will see various structural details which could be modified to suit a particular type of crop, size of bush, vehicular construction, or the like, without departing from the basic concepts set forth herein. Hence, the invention is intended to be limited only by the scope of the appended claims and the reasonably equivalent structures to those defined therein.

I claim:

1. A harvester unit for vibrationally removing items from their branches, comprising: at least one power beater unit comprising rotationally powered eccentric shaft means; beater means mounted to be eccentrically driven with rotation of said shaft means and also being freely rotatable about said shaft means, whereby said shaft means will cause said beater means to vibrate branches without scuffing them.

2. The unit in claim 1 wherein the eccentric orbit of said beater means is substantially larger than the eccentric orbit of said shaft means, and including peripheral contract means engageable with successive peripheral portions of said beater means, causing said beater means to rotate in the opposite direction and at a fraction of the rate of rotation of said shaft means, to thereby rotate in reverse of the arcuate direction of orbital advancement thereof, to compensate for forward orbital movement and hence minimize scuffing of branches.

3. The unit in claim 2 wherein said peripheral contact means makes friction contact with said beater means, allowing slippage of said beater means under any substantial external frictional stress between the beater and branches.

4. The unit in claim 1 wherein said shaft means has crank portions radially offset from the main shaft axis to cause the eccentric action, and said beater means is an elongated sleeve mounted around and to said offset crank portions by bearings.

5. The unit in claim 4 including peripheral contact means concentric with the main shaft axis and engageable with successive peripheral portions of said beater means, causing said beater means to rotate in the opposite direction and at a fraction of the rate of said shaft means, to thereby rotate in reverse of the direction of general advancement of the beater means, to minimize scuffing of branches.

6. A harvesting machine for vibrationally removing items from their branches, comprising: a power driven vehicle adapted to be driven in one main direction and having a plurality of elongated beater units thereon projecting in a generally normal direction to said vehicle main direction for projection into branches; means for shiting said unit in said normal direction for insertion thereof into and retraction thereof out of branches; each beater unit comprising rotationally powered eccentric shaft means, beater means mounted to be eccentrically driven with rotation of said shaft means and also being freely rotatable about said shaft means, whereby said shaft means will cause said better means to be eccentrically driven to vibrate branches without significant scuffing of the branches.

7. The machine in claim 6 wherein said shaft means has crank portions radially offset from the main shaft axis to cause the eccentric action, and said beater means is an elongated sleeve mounted around and to said offset crank portions by bearings.

8. The machine in claim 7 including peripheral contact means concentric with the main shaft axis and engageable with successive peripheral portions of said beater means, causing said beater means to rotate in the opposite direction of and at a fraction of the rate of said shaft means and to thereby rotate in reverse of the direction of general arcuate advancement thereof.

9. A harvesting machine for vibrationally removing items from their branches, comprising: a power driven vehicle having an inverted generally U-shaped configuration for straddling bushes with its depending legs; a plurality of beater units projecting inwardly from each leg toward the opposite leg and into the space between said legs to engage bushes between said legs; support means mounting said beater units adjacent the respective vehicle legs and having shifting means operably connected thereto; said support means being shiftable from a retracted condition generally out of said space, to an extended condition into said space for engaging the branches of bushes; each beater unit comprising rotationally powered eccentric shaft means, beater means mounted to be eccentrically driven with rotation of said shaft means and also being freely rotatable about said shaft means, whereby said shaft means will cause said beater means to vibrate branches without significantly scuffing them.

10. The machine in claim 9 wherein said shaft means has crank portions radially offset from the main shaft axis to cause the eccentric action, and said beater means is an elongated sleeve mounted to said offset crank portions by bearings.

11. The machine in claim 10 including peripheral contact means concentric with the main shaft axis and engageable with successive peripheral portions of said beater means, causing said beater means to rotate in the opposite direction and at a fraction of the rate of the rotation of said shaft means, to thereby rotate in reverse of the direction of general arcuate advancement of the beater means, to minimize scuffing of branches.

12. The machine in claim 9 including at least one top branch beater unit extending between said vehicle legs adjacent the cross beam of the vehicle to engage top branches of straddled bushes, and also having rotationally driven eccentric shaft means and cooperative freely rotatable, eccentrically driven beater means about said shaft means.

13. The machine in claim 9 wherein said beater units on each leg are arranged in at least two vertically arranged rows, one spaced behind the other, to allow overlap of bush portions with retraction and reinsertion of the beater means.

14. A harvesting machine for vibrationally removing items from their branches on bushes while the machine advances in a direction along a row of the bushes, comprising: a power driven vehicle having an inverted generally U-shaped configuration for straddling bushes in the space between its depending legs; a plurality of elongated eccentric beaters projecting inwardly from each leg toward the opposite leg, generally transverse to the vehicle direction of advance; said beaters being in groups of at least two which are spaced from each other longitudinally in said direction of advance; shiftable support means mounting said beaters and shiftable to extend the beaters from said legs into said space for engaging the branches of bushes, and to retract the beaters back toward said legs for general disengagement from the bushes; whereby as the vehicle is advanced, the longitudinally spaced beaters can be retracted and reinserted in a manner to allow overlap of bush portions and to minimzie potential damage to the bushes.

15. The machine in claim 14 wherein said beaters are arranged in at least two vertically arranged longitudinally spaced rows.

References Cited

UNITED STATES PATENTS

| | | | |
|---|---|---|---|
| 3,129,551 | 4/1964 | Lasswell | 56—328 |
| 3,245,211 | 4/1966 | Weygandt et al. | 56—330 |
| 3,396,521 | 8/1968 | McKibben et al. | 56—330 |

RUSSELL R. KINSEY, Primary Examiner

U.S. Cl. X.R.

56—46